(12) United States Patent
Jupudi et al.

(10) Patent No.: US 11,828,230 B2
(45) Date of Patent: Nov. 28, 2023

(54) SYSTEM AND METHOD FOR MITIGATING PARTICULATE INTRUSION TO AN AIR INTAKE SYSTEM OF A GAS TURBINE SYSTEM WITH INTRUSION PROTECTIVE COATINGS TAILORED TO LOCALE OF OPERATION

(71) Applicant: GENERAL ELECTRIC COMPANY, Schenectady, NY (US)

(72) Inventors: Maruthi Manohar Jupudi, Dubai (AE); Paul Mathew, Karnataka (IN); Jose Antonio Cuevas Alvarez, Aargau (CH); Bouria Mohamed Faqihi, Dubai (AE); Deoras Prabhudharwadkar, Bangalore (IN); Murali Krishna Kalaga, Salmiya (KW)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 17 days.

(21) Appl. No.: 17/492,737

(22) Filed: Oct. 4, 2021

(65) Prior Publication Data

US 2023/0108653 A1    Apr. 6, 2023

(51) Int. Cl.
*B01D 46/00* (2022.01)
*F02C 7/055* (2006.01)
(Continued)

(52) U.S. Cl.
CPC .............. *F02C 7/055* (2013.01); *B01D 45/04* (2013.01); *B01D 45/08* (2013.01); *B01D 46/003* (2013.01); *B01D 50/20* (2022.01); *F02C 7/052* (2013.01)

(58) Field of Classification Search
CPC .......... F02C 7/055; F02C 7/052; B01D 45/04; B01D 45/08; B01D 46/003; B01D 50/20
See application file for complete search history.

(56) References Cited

U.S. PATENT DOCUMENTS 3,564,820 A * 2/1971 Nelson .................. B01D 45/02
55/440
3,659,402 A * 5/1972 Alliger .................. B01D 45/08
55/525

(Continued)

OTHER PUBLICATIONS

Wilcox et al., "Technology Review of Modern Gas Turbine Inlet Filtration Systems", Hindawi Publishing Corporation, International Journal of Rotating Machinery, vol. 2012, Article ID 128134, 15 Pages, doi: 10.1155/2012/128134.

(Continued)

*Primary Examiner* — Dung H Bui
(74) *Attorney, Agent, or Firm* — Grogan, Tuccillo & Vanderleeden, LLP

(57) ABSTRACT

Mitigating particulate intrusion to an air intake system of a gas turbine system with intrusion protective coatings tailored to locale of operation. A particulate intrusion protective coating is applied to a surface of a component of the air intake system to mitigate ingress of particulates within the air intake system and the gas turbine system. The particulate intrusion protective coating includes one or more particulate ingress influencing properties tailored to the common attributes of the particulates associated with the locale of operation of the gas turbine engine and the air intake system. The particulate ingress influencing properties affect rebounding and coalescing characteristics of the particulates at a point of impact with the applied surface having the particulate intrusion protective coating, entraining the particulates at the point of impact and inhibiting further ingress along an inlet air flow path of the air intake system into the gas turbine engine.

19 Claims, 10 Drawing Sheets

(51) Int. Cl.
  B01D 50/20 (2022.01)
  B01D 45/04 (2006.01)
  B01D 45/08 (2006.01)
  F02C 7/052 (2006.01)

(56) References Cited

U.S. PATENT DOCUMENTS

| | | | | |
|---|---|---|---|---|
| 3,953,183 | A * | 4/1976 | Regehr | B01D 45/08 55/440 |
| 4,052,316 | A * | 10/1977 | Berger, Jr. | B01D 39/2024 210/DIG. 5 |
| 4,120,671 | A * | 10/1978 | Steinmeyer | B01D 46/003 55/486 |
| 4,568,365 | A * | 2/1986 | Metcalfe | B01D 45/08 55/400 |
| 4,581,051 | A * | 4/1986 | Regehr | B01D 45/08 55/440 |
| 4,784,674 | A * | 11/1988 | Sarmiento | B01D 45/04 55/440 |
| 4,878,929 | A * | 11/1989 | Tofsland | B01D 46/003 55/486 |
| 4,973,341 | A * | 11/1990 | Richerson | B01D 45/16 96/61 |
| 5,302,191 | A * | 4/1994 | Koutrakis | B01D 50/20 55/486 |
| 6,254,341 | B1 | 7/2001 | Ackerman et al. | |
| 6,332,987 | B1 * | 12/2001 | Whitney | B01D 46/24 210/DIG. 5 |
| 7,803,204 | B1 * | 9/2010 | Mladinich | F02C 7/055 55/306 |
| 8,414,676 | B2 | 4/2013 | Hiner et al. | |
| 8,475,115 | B2 | 7/2013 | Zhang et al. | |
| 9,718,012 | B2 | 8/2017 | Chung et al. | |
| 10,137,395 | B2 * | 11/2018 | Yoon | B01D 46/0087 |
| 10,220,353 | B2 | 3/2019 | Taylor | |
| 10,323,844 | B2 * | 6/2019 | Oda | F23J 3/04 |
| 10,488,040 | B2 * | 11/2019 | Oda | B01D 45/08 |
| 10,612,412 | B2 | 4/2020 | Vega et al. | |
| 10,780,385 | B2 | 9/2020 | Kippel et al. | |
| 2003/0150199 | A1 * | 8/2003 | Tanaka | B01D 39/1623 55/486 |
| 2008/0141636 | A1 * | 6/2008 | Singh | B01D 46/0031 96/108 |
| 2008/0209898 | A1 * | 9/2008 | Succi | F01N 3/0215 60/311 |
| 2008/0298957 | A1 * | 12/2008 | Chillar | F02C 7/143 62/401 |
| 2009/0019822 | A1 * | 1/2009 | Feisthammel | B01D 45/08 55/385.4 |
| 2010/0050873 | A1 * | 3/2010 | Hiner | B01D 46/64 95/287 |
| 2011/0154991 | A1 * | 6/2011 | Steele | B01D 46/121 96/189 |
| 2012/0117930 | A1 | 5/2012 | Nicholas | |
| 2012/0131891 | A1 * | 5/2012 | Nishiura | B01D 53/265 55/423 |
| 2012/0132075 | A1 * | 5/2012 | Jarrier | B01D 46/003 55/464 |
| 2012/0204568 | A1 * | 8/2012 | Jarrier | F01D 25/32 60/772 |
| 2015/0231573 | A1 * | 8/2015 | Sanderson | B01D 69/04 210/489 |
| 2016/0061158 | A1 | 3/2016 | Taylor | |
| 2016/0100728 | A1 * | 4/2016 | Lavoie | B01D 46/2403 55/447 |
| 2016/0138507 | A1 * | 5/2016 | Klassen | F02D 41/0002 123/198 E |
| 2017/0298286 | A1 | 10/2017 | Nowak et al. | |
| 2017/0312673 | A1 | 11/2017 | Smith et al. | |
| 2018/0320001 | A1 | 11/2018 | Nowak et al. | |
| 2019/0111375 | A1 * | 4/2019 | Chen | H05K 7/20736 |
| 2019/0160404 | A1 | 5/2019 | Smithies | |
| 2020/0230530 | A1 * | 7/2020 | Levitt | B01D 11/0288 |
| 2021/0069621 | A1 * | 3/2021 | Salama | B01J 35/0013 |
| 2021/0106939 | A1 * | 4/2021 | Takano | B01D 39/18 |
| 2021/0316239 | A1 * | 10/2021 | Gorrell | B01D 50/20 |
| 2022/0203379 | A1 * | 6/2022 | Kwon | B01D 46/4245 |
| 2023/0034885 | A1 * | 2/2023 | Jupudi | F02C 7/057 |

OTHER PUBLICATIONS

Wilcox et al., "Guideline for Gas Turbine Inlet Air Filtration Systems", Gas Machinery Research Council Southwest Research Institute, Release 1.0, Apr. 2010.

Extended European Search Report dated Feb. 3, 2023 from corresponding European Application No. 22196118.8.

* cited by examiner

SYSTEM AND METHOD FOR MITIGATING PARTICULATE INTRUSION TO AN AIR INTAKE SYSTEM OF A GAS TURBINE SYSTEM WITH INTRUSION PROTECTIVE COATINGS TAILORED TO LOCALE OF OPERATION

BACKGROUND

Technical Field

Embodiments of this disclosure relate generally to gas turbine systems, and more specifically, to mitigating particulate intrusion to an air intake system of a gas turbine system with intrusion protective coatings tailored to a locale of operation of the air intake system and the gas turbine system.

Discussion of Art

Gas turbine systems operate throughout the world in many diverse applications and environments, including in rural areas and heavy industrial zones, polar and tropic regions, deserts, coastal areas and at sea. In order to adapt the gas turbine systems to a variety of environments while realizing their full potential in performance and reliability, it is often necessary to treat the air which they consume to support the combustion process because impure air laden with dust particles, sand, salt, and other contaminants may damage the compressor blades and other types of equipment and components of the gas turbine system via corrosion, erosion, and fouling.

To prevent debris and/or particles from entering a gas turbine engine in a gas turbine system, an air intake system that directs a stream of inlet air to the gas turbine engine, is typically configured with an air filtration system that filters various sizes of debris and/or particles from the stream of inlet air prior to entering the compressor of the gas turbine engine. The diversity in application and environments in which the gas turbine systems can operate creates a number of challenges to the air filtration system, necessitating a different solution for each type of environmental contaminant(s), gas turbine platform technology, and/or fuel quality. For example, gas turbine systems which operate in deserts or high dust concentration areas, and/or high efficiency gas turbine systems operating at high operational temperatures, typically include an air filtration system that prevents undesirable debris or particles (e.g., sand, dust, etc.) from entering the gas turbine systems. Gas turbine systems which operate in coastal, marine, and off-shore platform installations present unique problems of inlet air contamination, as salt from seawater can become airborne in significant quantity due to wind and wave action, and give rise to corrosion. If the air filtration systems of these gas turbine systems fail to prevent the sand, dust and saltwater particles from entering the gas turbine engines, then the components of the gas turbine engines may become damaged and/or inoperable. Additionally, these undesirable particles flowing through components of the gas turbine engines may reduce the operational efficiency of the gas turbine systems.

BRIEF DESCRIPTION

The following presents a simplified summary of the disclosed subject matter in order to provide a basic understanding of some aspects of the various embodiments described herein. This summary is not an extensive overview of the various embodiments. It is not intended to exclusively identify key features or essential features of the claimed subject matter set forth in the Claims, nor is it intended as an aid in determining the scope of the claimed subject matter. Its sole purpose is to present some concepts of the disclosure in a streamlined form as a prelude to the more detailed description that is presented later.

The various embodiments of the present invention are directed to providing a novel and nonobvious approach to mitigating the intrusion of particulates and/or foreign object debris into an air intake system of a gas turbine system. The solution provided by the various embodiments includes applying a particulate intrusion protective coating to a component of the air intake system to mitigate ingress of the particulates within the air intake system and the gas turbine system. The particulate intrusion protective coating includes one or more particulate ingress influencing properties tailored to the common attributes of the particulates associated with the locale of operation of the air intake system and the gas turbine system. The particulate ingress influencing properties affect rebounding and coalescing characteristics of the particulates at a point of impact with the component having the particulate intrusion protective coating, entraining the particulates at the point of impact and inhibiting further ingress along the inlet air flow path of the air intake system into the gas turbine.

In the various embodiments, the particulate intrusion protective coating can be applied to the surface of one or more components of the air intake system. For example, the particulate intrusion protective coating can be applied to the surfaces of one or more components of the inlet filter house of the air intake system. In one embodiment, the particulate intrusion protective coating can be applied to a surface of one or more of a plurality of inlet vane separators, a plurality of moisture separators, and a plurality of drift eliminators.

In the various embodiments, the particulate ingress influencing properties of the particulate intrusion protective coating can be adjusted to achieve a low rebounding or bouncing effect or a high rebounding or bouncing effect of the particulates at the point of impact with the surface of the component having the particulate intrusion protective coating. In one embodiment, the particulate ingress influencing properties of the particulate intrusion protective coating can be adjusted to achieve one or more of the low rebounding effect and the high rebounding effect by altering the chemical composition of the particulate intrusion protective coating.

In accordance with one embodiment, a method for mitigating particulate intrusion into an air intake system of a gas turbine system having a gas turbine engine is provided. The method comprises: determining a locale of operation of the air intake system and the gas turbine system; ascertaining common attributes of particulates associated with the determined locale of operation that are expected to be ingested by the air intake system and the gas turbine system while operating in the determined locale of operation; and applying a particulate intrusion protective coating to a component of the air intake system to mitigate ingress of the particulates within the air intake system and the gas turbine system, wherein the particulate intrusion protective coating includes one or more particulate ingress influencing properties tailored to the ascertained common attributes of the particulates associated with the determined locale of operation, wherein the particulate ingress influencing properties affect rebounding, coalescing and hydrophilic characteristics of the particulates at a point of impact with the component having the particulate intrusion protective coating, entraining the particulates at the point of impact and inhibiting further ingress along the inlet air flow path of the air intake system into the gas turbine engine.

In accordance with another embodiment, a method is provided. The method comprises: determining a locale of operation of an air intake system of a gas turbine system having a gas turbine engine; ascertaining common attributes of particulates associated with the determined locale of operation that are expected to be ingested by the air intake system and the gas turbine system while operating in the determined locale of operation; customizing a particulate intrusion protective coating for application to a surface of a component of an inlet filter house of the air intake system with properties that mitigate ingress of the particulates within the air intake system and the gas turbine system for operation in the determined locale, wherein the customizing of the particulate intrusion protective coating includes altering a chemical composition of the particulate intrusion protective coating to have one or more particulate ingress influencing properties tailored to the ascertained common attributes of the particulates associated with the determined locale of operation, wherein the particulate ingress influencing properties affect rebounding, coalescing and hydrophilic characteristics of the particulates at a point of impact with the surface of the component of the inlet filter house having the particulate intrusion protective coating; and applying the customized particulate intrusion protective coating to the surface of one or more components of the inlet filter house, wherein the customized particulate intrusion protective coating applied to the surface of the one or more components of the inlet filter house entrains the particulates at the point of impact, and inhibits further ingress along the inlet air flow path of the air intake system from the inlet filter house into the gas turbine engine.

In accordance with third embodiment, a gas turbine system is provided. The gas turbine system comprises: a gas turbine engine; an air intake system operatively coupled to the gas turbine engine to direct a stream of inlet air to the gas turbine engine, the air intake system comprising an inlet filter house having a weather hood with a plurality of inlet vane separators and a plurality of moisture separators to permit passage of the stream of inlet air while preventing passage of weather elements, a filter module to filter the stream of inlet air passing through the weather hood, a cooling module to adjust the temperature of the filtered stream of inlet air, and a plurality of drift eliminators to protect against water carry-over from the cooling module; and a particulate intrusion protective coating applied to a surface of one or more of the plurality of inlet vane separators, the plurality of moisture separators, and the plurality of drift eliminators, wherein the particulate intrusion protective coating includes one or more particulate ingress influencing properties tailored to common attributes of particulates associated with a locale of operation of the gas turbine engine and the air intake system, wherein the particulate ingress influencing properties affect rebounding, coalescing and hydrophilic characteristics of the particulates at a point of impact with the applied surface having the particulate intrusion protective coating, entraining the particulates at the point of impact and inhibiting further ingress along an inlet air flow path of the air intake system into the gas turbine engine.

DRAWINGS

The present invention will be better understood from reading the following description of non-limiting embodiments, with reference to the attached drawings, wherein below:

Figure 7A:
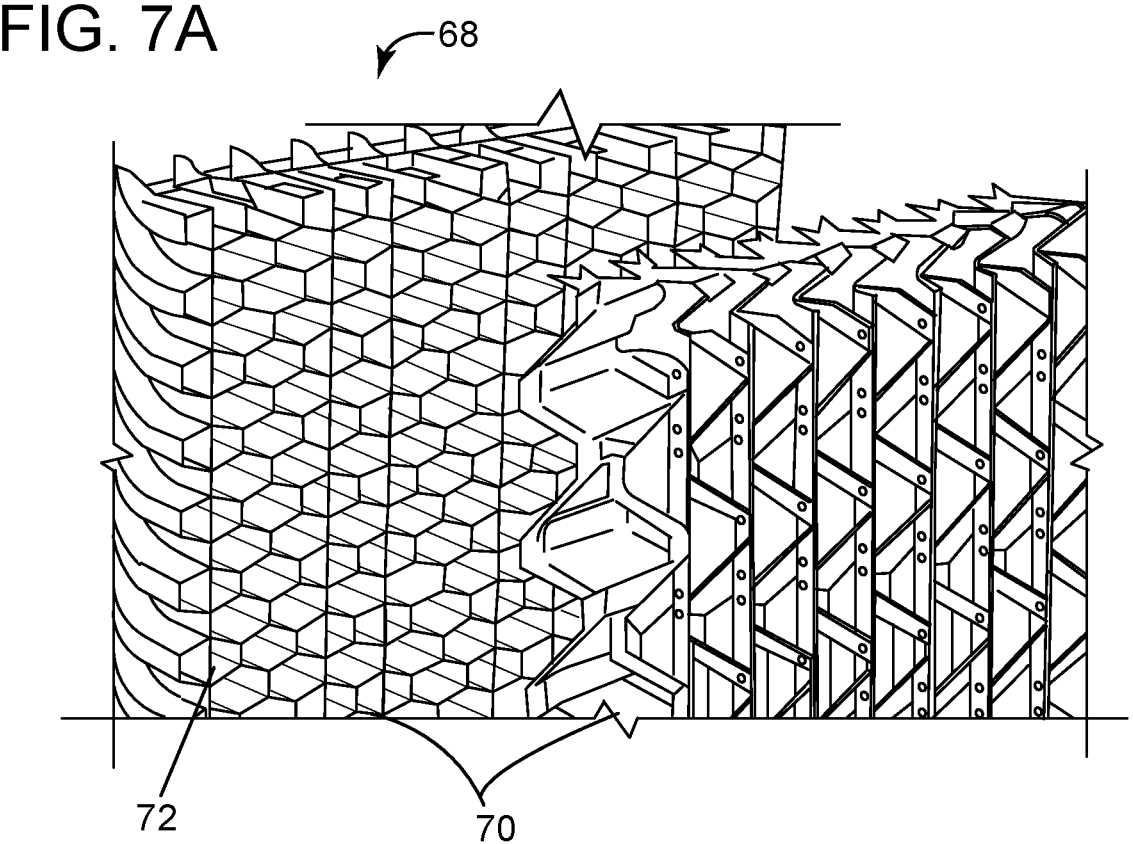
Figure 7B:
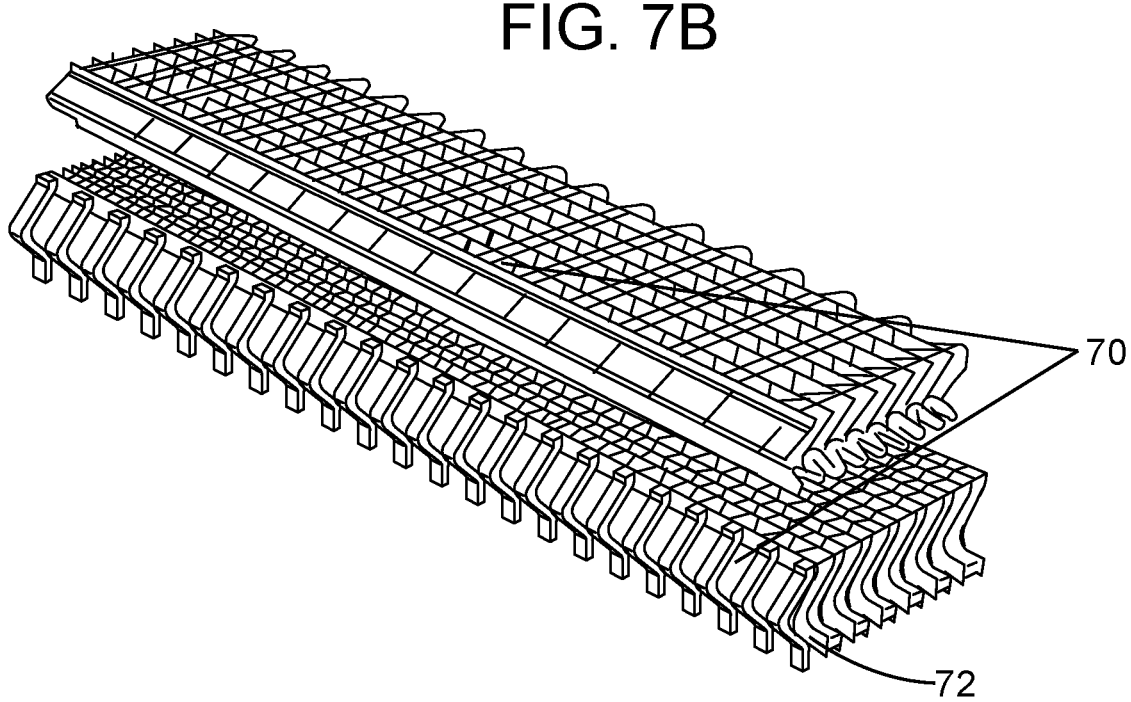
Figure 8:
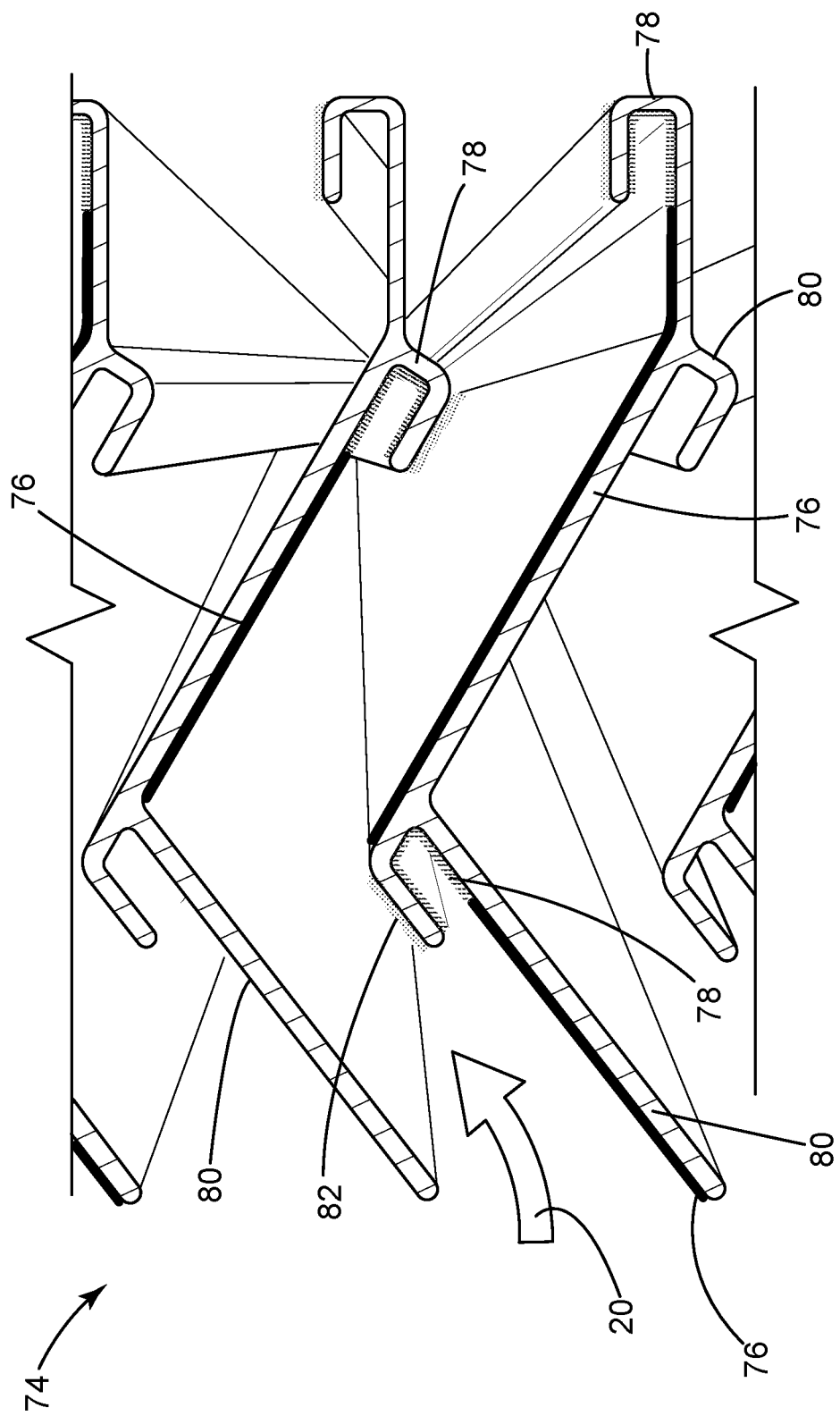

FIGS. 7A and 7B show a more detailed location of where the particulate intrusion protective coating is applied at the plurality of drift eliminators according to an embodiment of the invention; and FIG. 8 shows an example of particulate intrusion protective coatings tailored to attain desired rebounding characteristics applied at surfaces of various sections of an inertial separator in an inlet filter house according to an embodiment.

DETAILED DESCRIPTION

Example embodiments of the present invention will be described more fully hereinafter with reference to the accompanying drawings, in which some, but not all embodiments are shown. Indeed, the present invention may be embodied in many different forms and should not be construed as limited to the embodiments set forth herein; rather, these embodiments are provided so that this disclosure will satisfy applicable legal requirements. For like numbers may refer to like elements throughout.

As indicated above, this disclosure relates generally to gas turbine systems, and more specifically, to mitigating particulate intrusion of particulate matter (e.g., dust, sand, dirt, salt, water droplets, contaminants, and/or debris) to an air intake system of a gas turbine system with intrusion protective coatings tailored to a locale of operation of the air intake system and the gas turbine system. The mitigation of particulate intrusion of particulate matter to an air intake system of a gas turbine system with intrusion protective coatings as described in the various embodiments is suitable for use with all types of gas turbine systems and gas turbine combustion systems utilizing turbomachinery regardless of their application (e.g., land-based, marine-based, and aviation based applications). Gas turbine systems and gas turbine combustion systems using turbomachines that include, but are not limited to, heavy frame industrial gas turbines, aeroderivative gas turbines, marine gas turbines, ammonia-fueled gas turbines, hydrogen-fueled gas turbines, aviation gas turbines, and general combustion turbines are non-limiting examples of systems that can have a need to mitigate particulate intrusion of any of a number of different of types of particulate matter, and thus, are applicable for use with the various embodiments. Although the various embodiments are described with respect to gas turbine systems, the intrusion protective coatings as described in these embodiments, as well as the selectability and adjustability of the coatings as taught herein has applicability with any air-dependent machine that requires clean air to operate.

Figure 1:
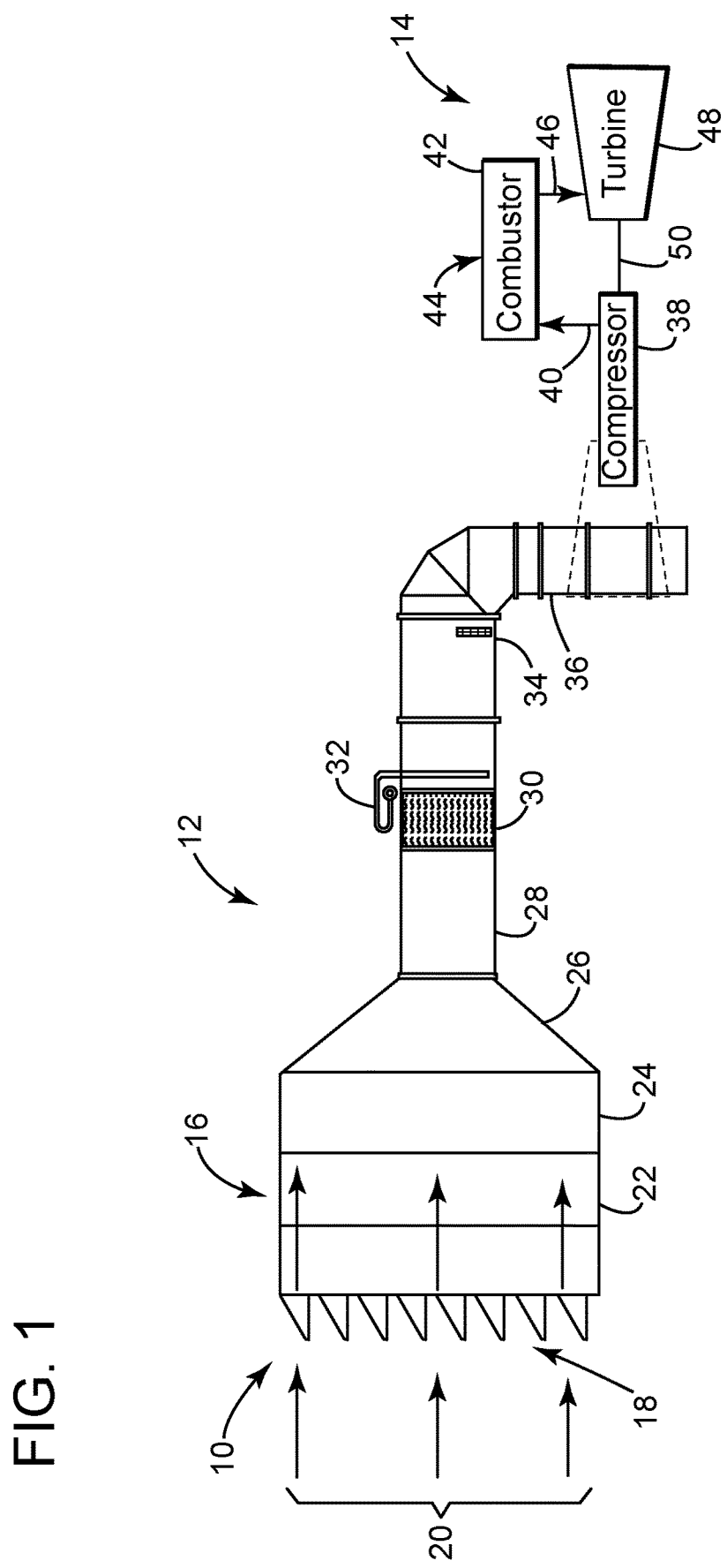
FIG. 1 shows a schematic of a gas turbine system having an air intake system and a gas turbine engine according to an embodiment of the invention.

Turning now to the figures, FIG. 1 shows a schematic of a gas turbine system 10 having an air intake system 12 and a gas turbine engine 14 according to an embodiment of the invention. As shown in FIG. 1, the air intake system 12 can include an inlet filter house 16. A weather hood 18 mounted on the inlet filter house 16 permits passage of a stream of inlet air 20 and can prevent weather elements such as rain, snow, and the like from entering therein. The weather hood 18 may be largely of conventional design, and can include a plurality of inlet vane type separators and moisture separators to prevent heavy rain or heavy fog mist from entering the inlet filter house 16. For example, the inlet vane type separators can remove water droplet particles larger than a specified size (e.g., 5 microns in size) to prevent liquid droplets from carrying any absorbed salt downstream into the gas turbine engine 14. The moisture separators can remove water droplets particles that are smaller than the specified size. In particular, the moisture separators can collect smaller aerosol droplets and coalesce them into large droplets which can be easily removed with the help of the inertia of the larger droplets.

The inlet filter house 16 can include a filter module 22 that can further remove moisture as well as particulate matter (such as dust, sand, dirt, salt, water droplets, contaminants, and/or debris) from the stream of inlet air 20 channeled to the gas turbine engine 14. In one embodiment; the filter module 22 can include a multiple of filter stages to filter the stream of inlet air 20 provided to the gas turbine engine 14. The filter stages can be disposed in series in the inlet filter house 16 such that a first filter stage applies a first filter to the stream of inlet air 20, while a second filter stage, downstream of the first filter stage, applies an additional filtering of the stream of inlet air 20. The filter module 22 can include additional stages to further remove any moisture and/or particulate matter that may remain after filtering in the upstream filter stages. As used herein, "downstream" and "upstream" are terms that indicate a direction relative to the flow of a fluid, such as the working fluid through the gas turbine system, for example, the flow of air through the air intake system or through one of the components of a gas turbine engine. The term "downstream" corresponds to the direction of flow of the fluid, and the term "upstream" refers to the direction opposite to the flow.

Each of the filter stages in the filter module 22 can include any suitable filtering component that may be configured to remove and/or filter out large and small particles and/or debris that may be found in the stream of inlet air 20, such as, sand grains, dirt, dust, salt, rain drops, snow, and other undesirable debris and contaminants. In one embodiment, each of the filter stages in the filter module 22 can include an array of fabric filters (e.g., fabric filter bags, conical fabric filters, pulse fabric filters, static fabric filters, and the like) that can filter finer and/or smaller particulates from the stream of inlet air 20 flowing therethrough.

The inlet filter house 16 can further include a cooling module 24 to adjust the temperature of the filtered stream of inlet air 20. The cooling module 24 can be a useful gas turbine system option for applications where significant operations occur in warmer months and where low relative humidity is common (e.g., in desert regions). The cooled air provided to the stream of inlet air 20 by the cooling module 24, downstream of the filter module 22, is generally denser and gives the gas turbine engine 14 a higher mass flow rate and pressure ratio. This results in an increase in turbine output and efficiency. The cooling module 24 can include the use of widely known systems such as an evaporative cooler or an inlet chiller.

After passing through the cooling module 24, the stream of inlet air 20 can then flow through a transition piece 26 that connects the inlet filter house 16 to an inlet duct 28, A silencer section 30 and an inlet bleed heat system 32 may also be used therein. In particular, the silencer section 30 can reduce the "noise" associated with the stream of inlet air 20 transmitted through the air intake system 12, and the inlet bleed heat system 32 can use a portion of the compressor discharge from the gas turbine engine 14 for heating the inlet air. One or more screens 34 may be used to deflect larger types of contaminates or debris. The stream of inlet air 20 then may pass through an inlet plenum 36 and into the gas turbine engine 14 as combustion inlet air for compression and combustion.

It is understood that the air intake system 12 can be configured to include other components, and thus, the description of the air intake system as depicted FIG. 1 as well as the other figures described herein is not meant to be limiting. For example, the inlet filter house 16 can be configured with heating or de-icing components to warm the stream of inlet air 20 and/or components of the inlet filter house such as for example, the filter module 22. Sensors (e.g., temperature sensors, pressure sensors, humidity sensors, flow sensors) can measure various conditions associated with the inlet filter house 16 and its components, as well as conditions associated with the stream of inlet air 20. Other components can include, but are not limited to, a by-pass duct that diverts clean, filtered inlet air from the inlet plenum 36 and supplies it as ventilation inlet air to a gas turbine enclosure that encloses the gas turbine engine 14.

As is known and shown in FIG. 1, the gas turbine engine 14 may include a compressor 38. The compressor 38 compresses the combustion inlet air provided by the inlet plenum 36 of the air intake system 12. The compressor 38 delivers a compressed flow of air 40 to a combustor 42. The combustor 42 mixes the compressed flow of air 40 with a compressed flow of fuel 44 and ignites the mixture in a chamber to create a flow of combustion gases 46. The flow of combustion gases 46 is in turn delivered to a turbine 48. The flow of combustion gases 46 produces mechanical work by driving turbine blades of the turbine 48 to rotate a shaft 50 along an axis of the gas turbine engine 14. The shaft 50 can be connected to various components of the gas turbine engine 14, including the compressor 38, The compressor 38 also includes blades coupled to the shaft 50, To this extent, as the shaft 50 rotates, the blades within the compressor 38 also rotate, thereby compressing the combustion inlet air from the air intake system 12 through the compressor 38 and into fuel nozzles that distribute the mixture of compressed air and fuel into the combustor 42. The shaft 50 may also be connected to a load, such as an electrical generator. In this manner, the mechanical work in the turbine 48 can drive the electrical generator to produce power.

The gas turbine engine 14 can use natural gas, various types of syngas, and/or other types of fuels. In addition, the gas turbine engine 12 may be any one of a number of different gas turbine engines such as those offered by the General Electric Company. For example, the gas turbine engine 12 can include, but is not limited to, a heavy frame industrial gas turbine, an aeroderivative gas turbine, a marine gas turbine, an ammonia-fueled gas turbine, a hydrogen-fueled gas turbine, an aviation gas turbine, and a general combustion turbine.

It is understood that the gas turbine system 10 depicted in FIG. 1, as well as the other figures disclosed herein that illustrate the gas turbine systems of other embodiments, can include a number of other components shown in the figures. For example, the gas turbine systems can include, but are not limited to, a gas turbine enclosure that houses the gas turbine engine 14, a gas turbine exhaust for releasing exhaust gases from the gas turbine engine, and a gas turbine ventilation system to purge and ventilate heat and exhaust products from the gas turbine engine 14.

The various embodiments of the present invention are directed to mitigating the intrusion of particulates (e.g., dust, sand, dirt, salt, water droplets, contaminants) and/or foreign object debris into the air intake system 12 of the gas turbine system 10. The solution provided by the various embodiments includes applying a particulate intrusion protective coating to a component of the air intake system 12 to mitigate ingress of the particulates within the air intake system and the gas turbine engine 14. The particulate intrusion protective coating includes one or more particulate ingress influencing properties that can be tailored to the common attributes of the particulates associated with the locale of operation of the air intake system 12 and the gas turbine system 10. The particulate ingress influencing properties affect rebounding and coalescing characteristics of the particulates at a point of impact with the component having the particulate intrusion protective coating, entraining the particulates at the point of impact, and inhibiting further ingress along the inlet air flow path of the air intake system 12 into the gas turbine engine 14.

In the various embodiments, the particulate intrusion protective coating can comprise resin coatings such as polyurethane coatings, epoxy coatings, and combinations thereof. In one embodiment, the polyurethane coatings can contribute towards generating rebound and erosion characteristics, while the epoxy coatings can provide hydrophilic characteristics. Examples of polyurethane coatings that can mitigate particulate intrusion into an air intake system of a gas turbine system by generating rebound and erosion characteristics, include, but are not limited to, FRITEM Polyurethane, NORMET Polyurethane such as TAMPUR 150 MDI. Examples of epoxy coatings that can mitigate particulate intrusion into an air intake system of a gas turbine system by providing hydrophilic characteristics, include, but are not limited to, INTERZONE 954, FRITEM Epoxy, and BOSTIK EPDXYCOTE SF.

In one embodiment, the particulate intrusion protective coating can include the addition of modifiers to the resin coatings. These modifiers can enhance properties of the particulate intrusion protective coating that include, but are not limited to, strength, erosion performance and damping behavior. The modifiers can include typical particle modifiers such as silica particles, fly ash particles, alumina particles, Glass fiber, KEVLAR fiber, carbon fiber, etc. In one embodiment, Silica ~5-10 wt % can be added to enhance the hydrophilic behavior of an epoxy coating, as well as erosion resistance and strength of the epoxy coating. The modifiers can also include other functional modifiers specific to epoxy. For example, functional modifiers for an epoxy coating can include, but are not limited to, diglycidyl ethers and esters, thinner, plasticizer, binders, metallic particulates, etc. Additional epoxy functional modifiers can include HELOXY epoxy functional materials that are epoxy functionalized alcohols, diols, polyols and acids that allow formulators to choose among mono-functional and poly-functional glycidyl ethers and flexibilizers for formulating needs.

In one embodiment, the particulate intrusion protective coating can comprise a multi-layer coating. The multi-layer coating can include polyurethane layers, epoxy layers, polyurethane layers and/or epoxy layers with modifiers, and combinations of polyurethane layers and epoxy layers with or without modifiers. For example, in one embodiment, a multi-layered particulate intrusion protective coating can comprise a top layer having 10-75 wt. % Polyurethane+5-40 wt. % Epoxy) composition, and a bottom layer deposited on a substrate having 10-75 wt. % Epoxy+5-40 wt. % PU. In one embodiment, the particulate intrusion protective coating can comprise a coating having a multiple of layers of varying gradient composition.

The above examples for the particulate intrusion protective coating are illustrative of coatings that are characterized by mechanical robustness and reliability and are suitable for application in harsh environments. The various embodiments that depict the use of a particulate intrusion protective coating as described herein with certain components in an air intake system of a gas turbine system can result in a longer life and better performance due to the coatings ability to mitigate erosion, corrosion, and deposition issues that arise individually or in combination. It is understood that these examples of particulate intrusion protective coatings are only illustrative of a few possible options and are not meant to be limiting.

Figure 2:
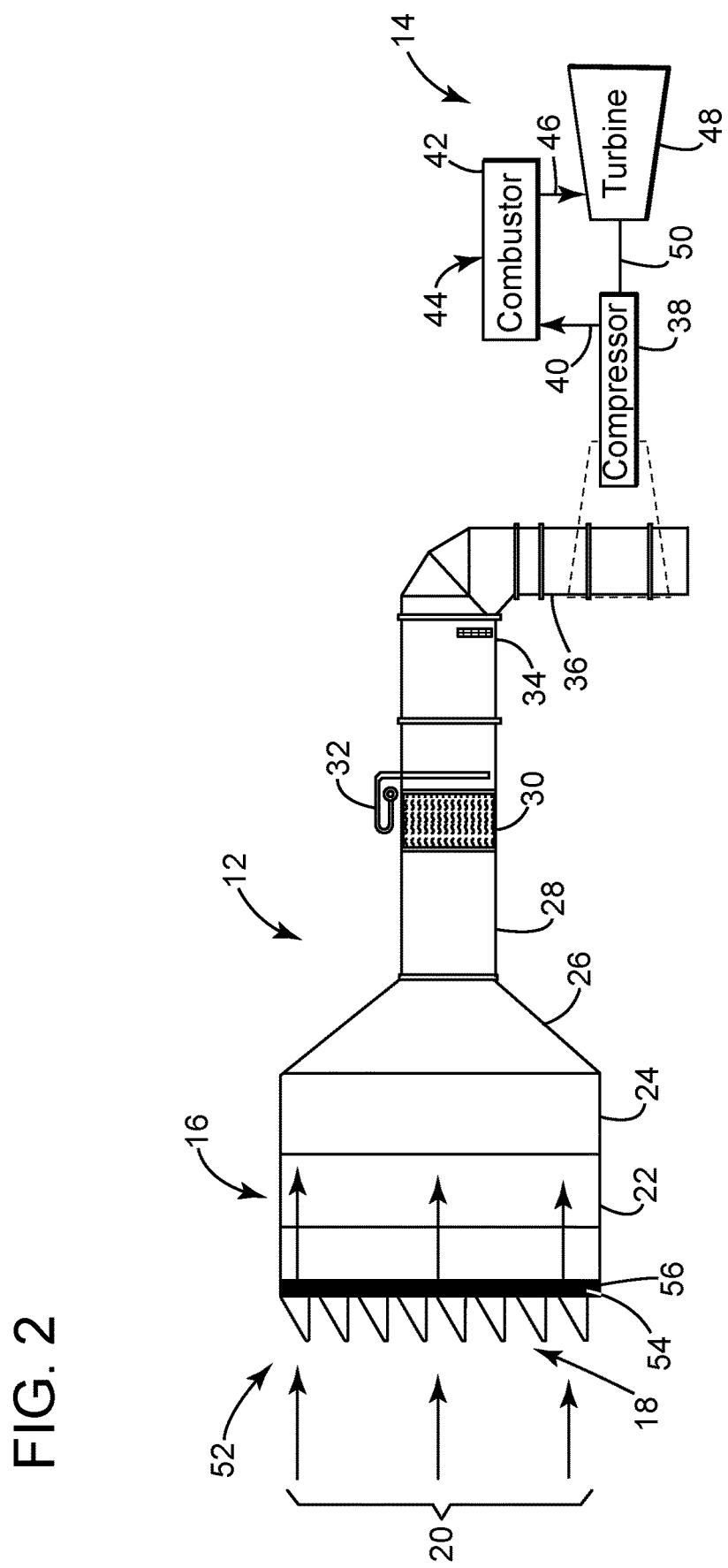
FIG. 2 shows a schematic of a gas turbine system with a particulate intrusion protective coating applied to an inlet filter house at a plurality of inlet vane separators in the weather hood according to an embodiment of the invention.

The particulate intrusion protective coating of the various embodiments can be applied to the surface of one or more components of the air intake system 12. For example, the particulate intrusion protective coating can be applied to the surfaces of one or more components of the inlet filter house 16 of the air intake system 12. FIG. 2 shows a schematic of a gas turbine system 52 with a particulate intrusion protective coating 54 applied to the inlet filter house 16 at a plurality of inlet vane separators 56 in the weather hood 18 according to an embodiment of the invention.

Figure 3A:
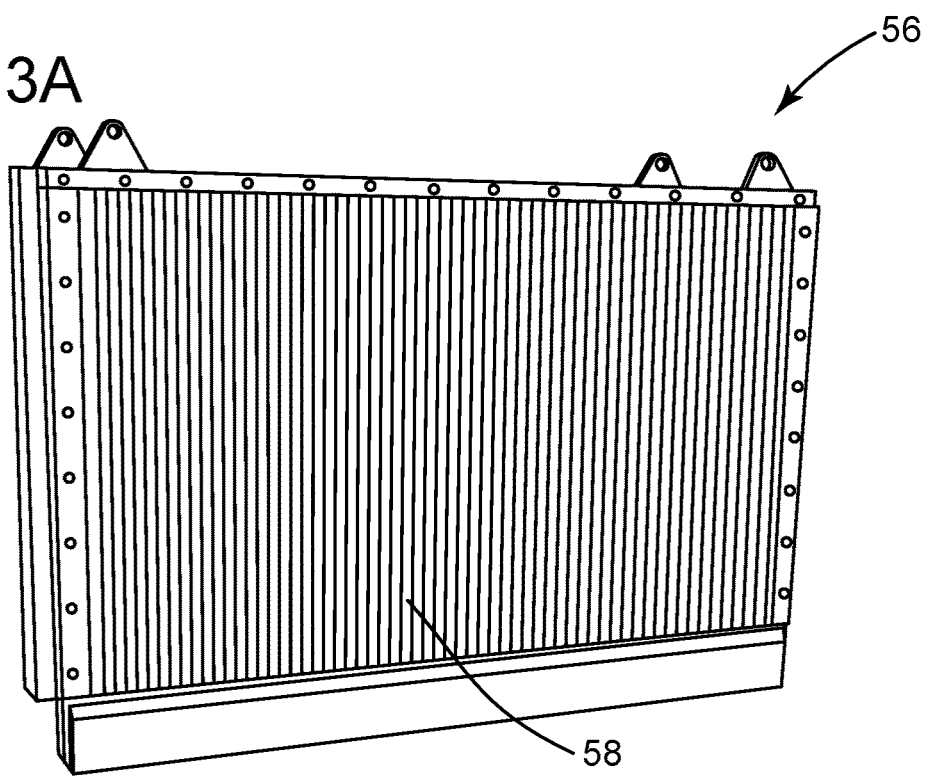
FIGS. 3A and 3B show a more detailed location of where the particulate intrusion protective coating is applied at the plurality of inlet vane separators in the weather hood according to an embodiment of the invention.
Figure 3B:
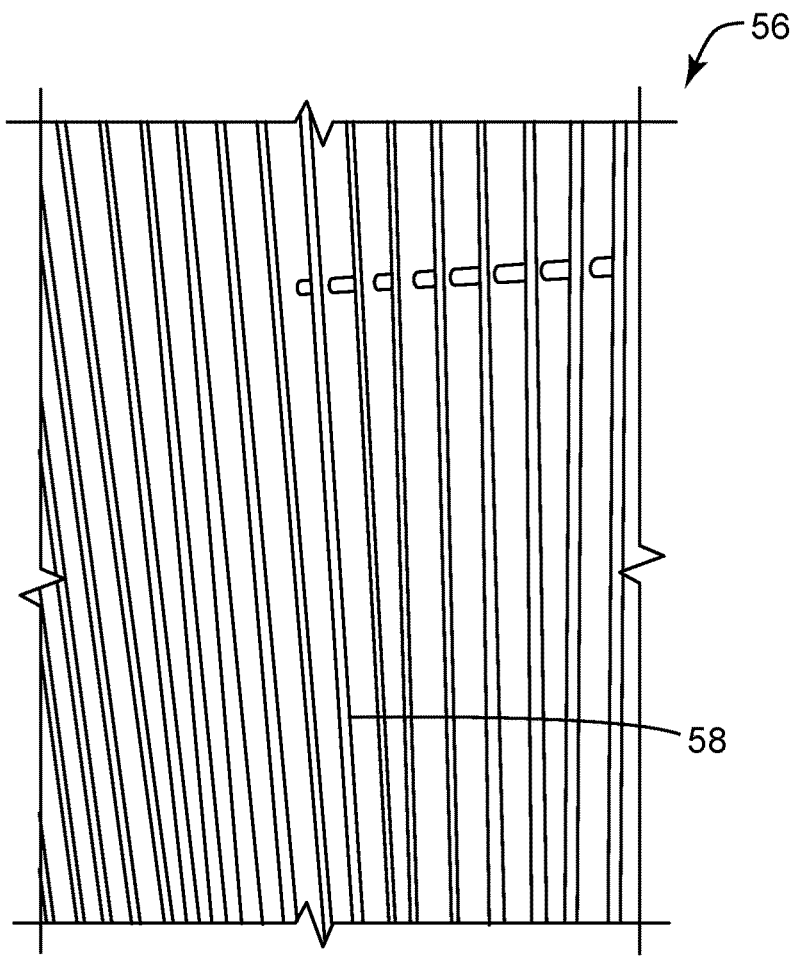

In one embodiment, the particulate intrusion protective coating 54 can be applied to the inlet vane separators 56 on the front surface of the separators facing the stream of inlet air 20. FIGS. 3A and 3B show a front surface 58 of an inlet vane separator 56 that can face the stream of inlet air 20 upon installation, and where the particulate intrusion protective coating 54 can be applied. It is understood that the particulate intrusion protective coating 54 can be applied to other locations about the inlet vane separators 56.

Applying the particulate intrusion protective coating 54 to the inlet vane separators 56 can be beneficial in that it will provide a higher efficiency for the same micron particle sizes and increased filtration capability for smaller than 25 microns. In one embodiment, with the particulate intrusion protective coating described herein, the inlet vane separators 56 will be able to remove smaller particles having a size that is approximately smaller than 5 microns.

Although the embodiment depicted in FIGS. 2, 3A and 3B is described with respect to applying a particulate intrusion protective coating to inlet vane separators, it is not meant to be limiting. For example, it is understood that this embodiment is applicable to all inertial separators that work on the basis of inertia. This can include, but is not limited to, vane-type and spin-type inertial separators.

Figure 4:
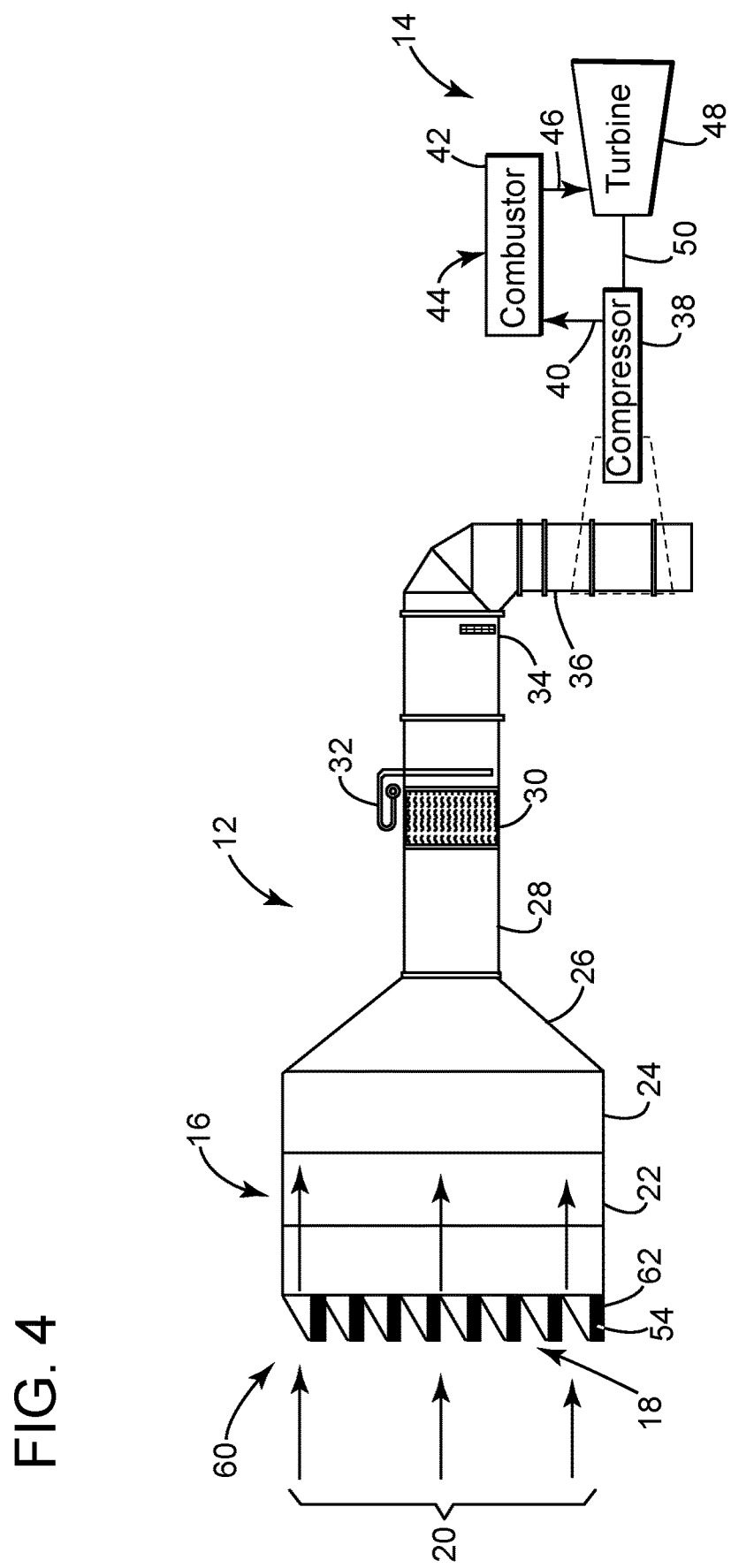
FIG. 4 shows a schematic of a gas turbine system with a particulate intrusion protective coating applied to the inlet filter house at a plurality of moisture separators proximate the weather hood according to an embodiment of the invention.

FIG. 4 shows an embodiment of another location within the inlet filter house 16 in which the particulate intrusion protective coatings described herein can be applied. In particular, FIG. 4 shows a schematic of a gas turbine system 60 with a particulate intrusion protective coating 54 applied to the inlet filter house 16 at a plurality of moisture separators 62 proximate the weather hood 18 according to an embodiment of the invention. In one embodiment, the particulate intrusion protective coating 54 can be applied to the moisture separators 62 on the surfaces of the separators facing the stream of inlet air 20 as it passes through the weather hood 18.

Figure 5A:
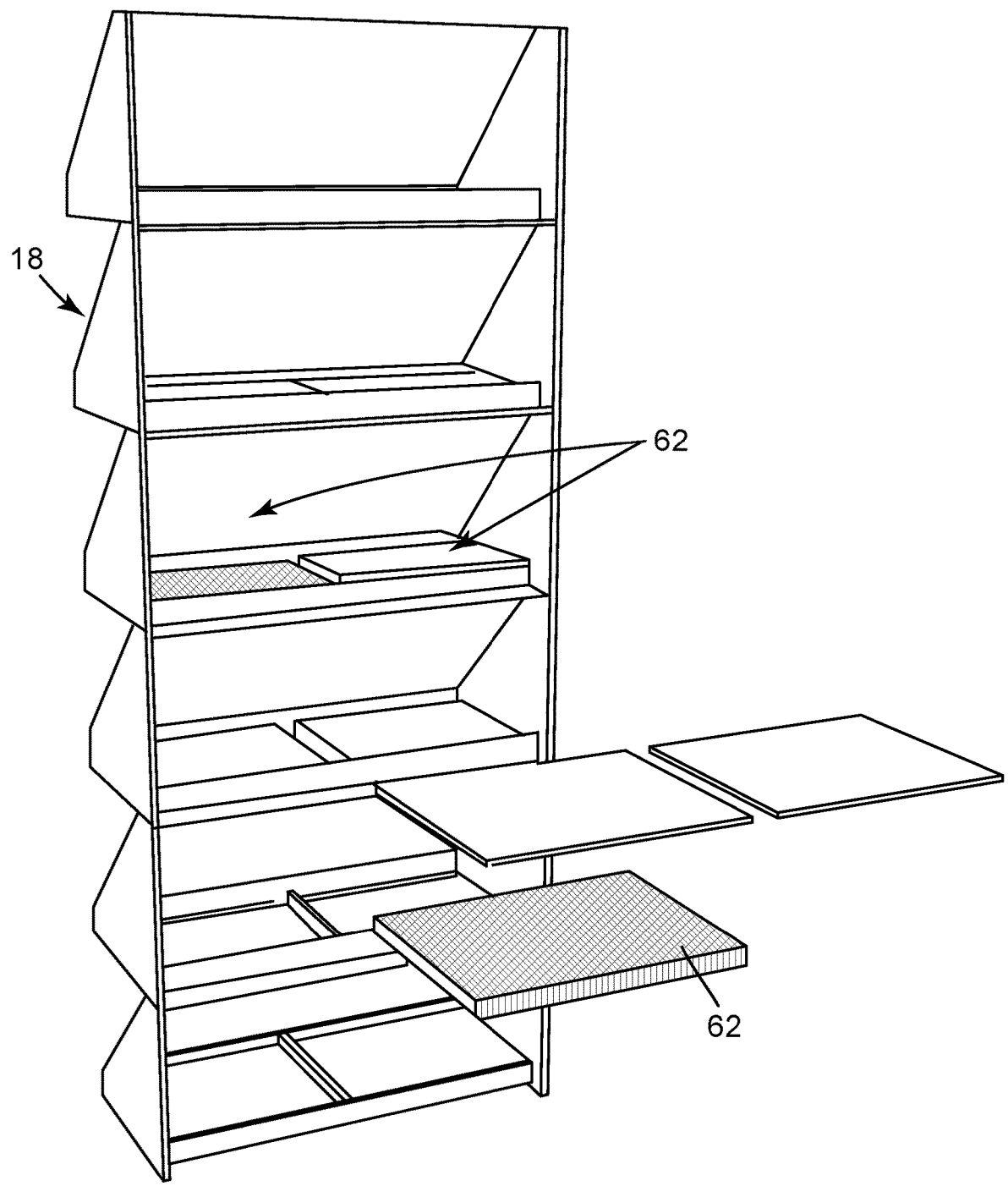
FIGS. 5A-5C show a more detailed location of where the particulate intrusion protective coating is applied at the plurality of moisture separators according to an embodiment of the invention.
Figure 5B:
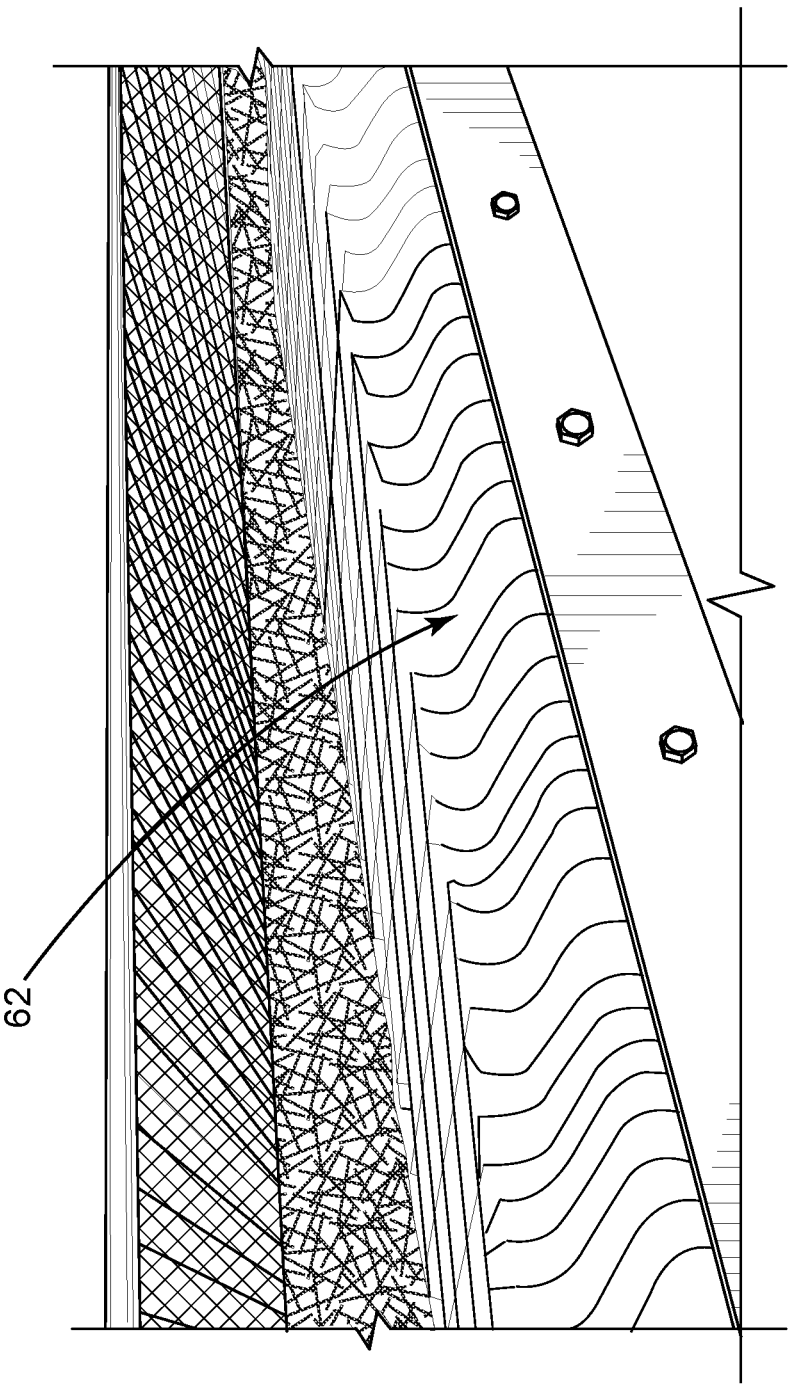
Figure 5C:
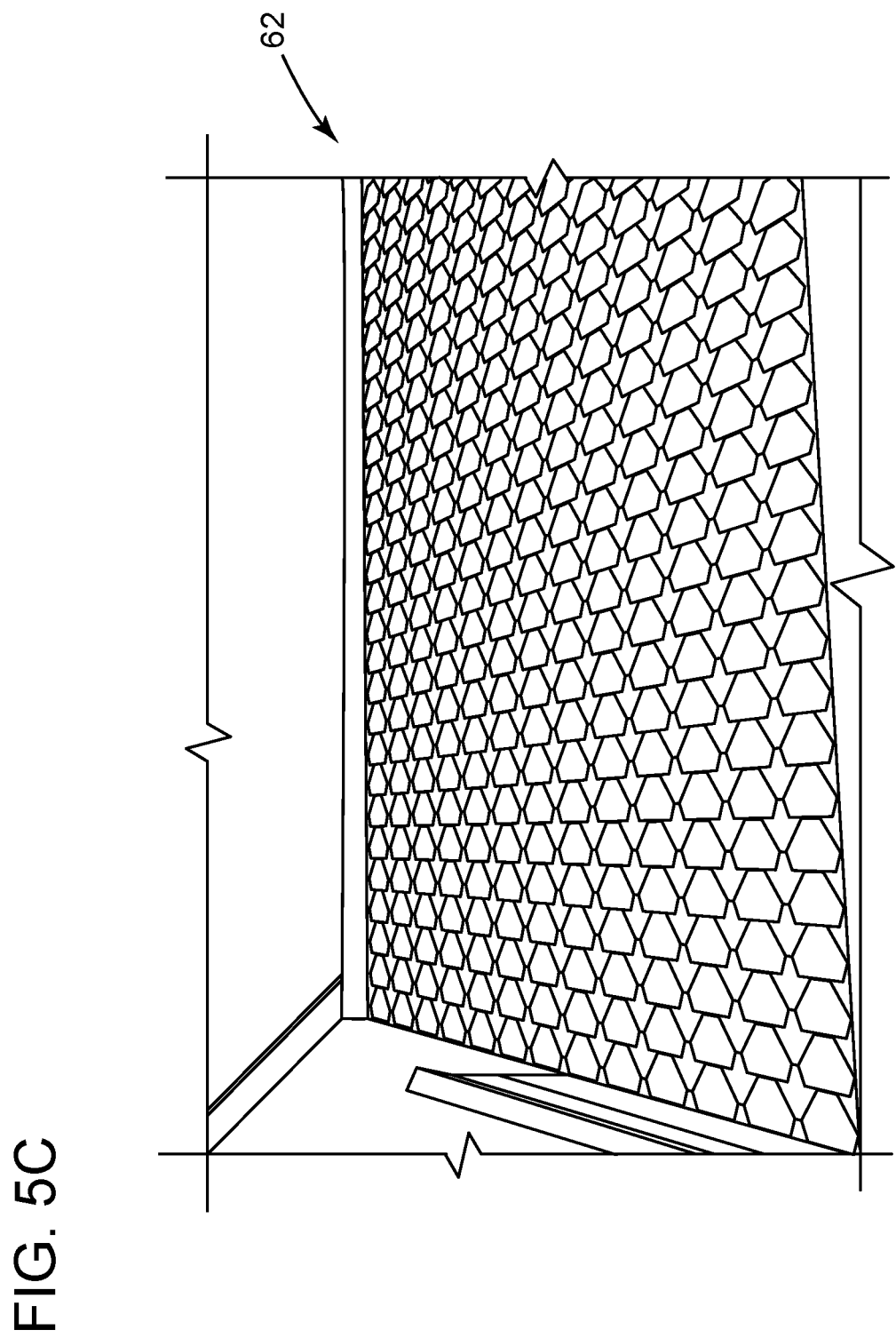

FIG. 5A shows the moisture separators 62 proximate the weather hood 18, while FIGS. 5B and 5C show a more detailed view of the moisture separators. The moisture separators 62 can be made of PVC although other materials are possible (e.g., aluminum). In one embodiment, the moisture separators 62 can be formed in an "S" pattern to separate moisture by inertial separation. The "S" shape of the moisture separators 62 is shown in the side view of FIG. 5B. FIG. 5C, which is more of a top view of the moisture separators 62, shows that the "S" shape of the moisture separators looks like a honeycomb architecture. The particulate intrusion protective coating 54 can be applied to these surfaces of the moisture separators 62.

Applying the particulate intrusion protective coating 54 to the moisture separators 62 can be beneficial in that it will provide a higher efficiency for the same micron particle sizes and increased filtration capability for smaller than 25 microns. In addition, applying the particulate intrusion protective coating 54 to the moisture separators 62 can reduce the ingress of corrosion-enablers and contamination particles downstream, as well as reduce the load of particles that will reach the main filters, thereby increasing filter life. In one embodiment, the moisture separators 62 with the particulate intrusion protective coating applied thereto will be able to remove particles having a size that is smaller than 5 microns.

Figure 6:
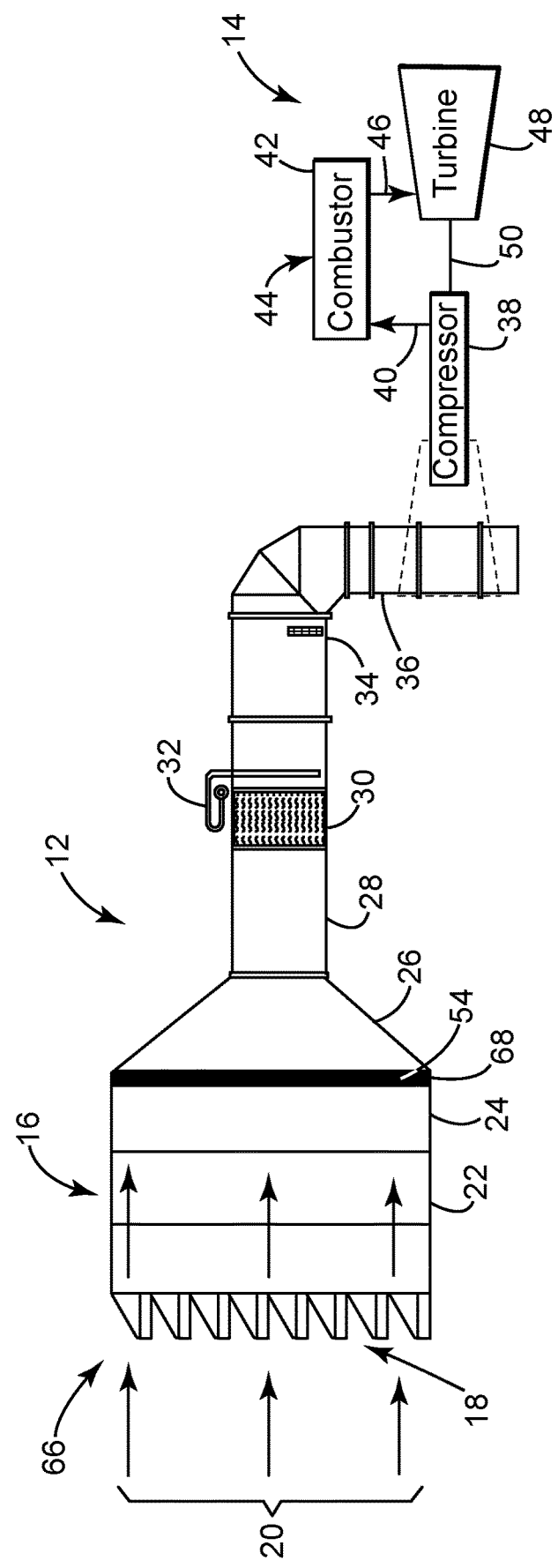
FIG. 6 shows a schematic of a gas turbine system with a particulate intrusion protective coating applied to the inlet filter house at a plurality of drift eliminators downstream of a cooling module according to an embodiment of the invention.

FIG. 6 shows an embodiment of still another location within the inlet filter house 16 in which the particulate intrusion protective coatings described herein can be applied. In particular, FIG. 6 shows a schematic of a gas turbine system 66 with a particulate intrusion protective coating 54 applied to the inlet filter house 16 at a plurality of drift eliminators 68 located downstream of the cooling module 24 to protect against the possibility of water carryover and ingestion of such water carry-over by the gas turbine engine 14. In one embodiment, the drift eliminators 68 can include corrugated, inertial drift eliminators that are provided downstream of the cooling module 24. In this manner, the corrugated, inertial drift eliminators can remove water droplets from the stream of inlet air 20 such that the droplets are prevented from proceeding thru the inlet duct 28 and entering the gas turbine engine 12.

FIGS. 7A and 7B show a more detailed view of the drift eliminators 68, and in particular, corrugated sheets 70 that form the drift eliminators. As shown in FIGS. 7A and 7B, the corrugated sheets 70 of the drift eliminators 68 can be formed to create channels 72 where the water droplets carried by the stream of inlet air 20 are efficiently trapped while maintaining a low pressure drop. In one embodiment, the particulate intrusion protective coating 54 can be applied to the inner surfaces of the channels 72.

The particulate intrusion protective coating 54 to the drift eliminators 68 can be beneficial in that it will provide a higher efficiency for the same micron particle sizes and increased filtration capability for smaller than 25 microns. In one embodiment, with the particulate intrusion protective coatings described herein, the drift eliminators 68 will be able to removal particles having a size smaller than 5 microns.

The particulate intrusion protective coating 54 can be applied to the inlet vane separators 56, the moisture separators 62 and the drift eliminators 68 using any of a number of well-known techniques. In one embodiment, the particulate intrusion protective coating 54 can be applied to the inlet vane separators 56, the moisture separators 62 and the drift eliminators 68 by compressed air spray coating. Other approaches for applying the particulate intrusion protective coating 54 to the various surfaces of the inlet vane separators 56, the moisture separators 62 and the drift eliminators 68 can include, but are not limited to, a straight brush, a roller brush, dipping, and pour laying.

Although application of the particulate intrusion protective coating 54 is described with the inlet vane separators 56, the moisture separators 62 and the drift eliminators 68 in individual configurations as shown in FIGS. 2, 4, and 6, it is understood that the coating can be applied to surfaces of one or more of the inlet vane separators, the moisture separators and the drift eliminators, as well as surfaces of other components of the inlet filter house 16 that can have the coating applied thereto.

In another aspect of the various embodiments, the inventors have determined that the particulate ingress influencing properties of the particulate intrusion protective coating 54 can be tailored to the common attributes of the particulates associated with the locale of operation of the air intake system and the gas turbine system. In particular, the particulate ingress influencing properties of the particulate intrusion protective coating that affect rebounding and coalescing characteristics of the particulates at a point of impact with the component(s) of the inlet filter house 16 having the particulate intrusion protective coating can be adjusted to impart a desired mitigating action to the particulates that are commonly associated with a location in which the air intake system and gas turbine system operate.

For example, in one scenario where the air intake system and the gas turbine system operate in a dusty and sandy environment like desert locations, then the particulate intrusion protective coating of the various embodiments can be adjusted to impart a specified bouncing or rebounding effect to the particulates in the stream of inlet air so that the particulates are entrained at the point of impact with the surface having the coating, and thus, inhibiting further ingress along the inlet air flow path of the air intake system into the gas turbine. To this extent, the specified bouncing or rebounding effect can be helpful in directing sand and/or dust particles away from the stream of inlet air. The angle or the trajectory that the sand and dust particulates take in response to impact with the surface having the particulate intrusion protective coating can vary. Accordingly, it may be desirable to have the particulates rebound at a low angle or trajectory (i.e., a low rebound) or to have the particulates rebound at a high angle or trajectory (i.e., a high rebound). The angle or trajectory can depend on factors such as the location and direction that it is desired to direct the particulates towards and away from the stream of inlet air, and the location of the component having the particulate intrusion protective coating in relation to the inlet air.

In another scenario, the air intake system and the gas turbine system can operate in a coastal environment where moisture, humidity, and accompanying elemental particulates such as salt can be a concern with the stream of inlet air. In such a scenario, the particulate intrusion protective coating of the various embodiments can be adjusted to increase the coalescence or hydrophilic nature of the coating so that the water droplets in the stream of inlet air at the point of impact with the surface having the coating are entrained, and thus, prevented from further ingress along the inlet air flow path of the air intake system into the gas turbine. In addition, having a particulate intrusion protective coating with a low rebound properties can facilitate the coalescence of the water droplets because the low rebound leads to integration and eventually coalescence of the droplets. Removing water droplets in this way with salt particulates can be beneficial in preventing corrosion, erosion and fouling of components in the air intake system and the gas turbine engine as a barrier layer can be formed on the surface of impact. Having a particulate intrusion protective coating with hydrophilic and low rebound properties can enable the droplets to flow easily off the surface of impact away from the stream of inlet air. This can be beneficial in preventing corrosion, erosion and fouling of components in the air intake system and the gas turbine engine because the droplets with salt do not collect on the surface of impact, obviating the deleterious effect that the salt can have on components in the stream of inlet air.

In still another scenario, the air intake system and the gas turbine system can operate in an environment in which a multiple of different types of particulates are commonly present in the stream of inlet air ingested by the air intake system and the gas turbine engine such as sand grains, dirt, dust, salt, rain drops, snow, and other undesirable debris and contaminants. In such a scenario, the particulate intrusion protective coating of the various embodiments can be adjusted to balance the rebounding, the coalescence and the hydrophilic nature of the coating to achieve a desired effect (e.g., rebounding, coalescence, hydrophilic, mixture of rebounding, coalescence and hydrophilic properties) on the particulates in the stream of inlet air at the point of contact in order to prevent further ingress along the inlet air flow path of the air intake system into the gas turbine engine.

In one embodiment, the chemical composition of the particulate intrusion protective coating can be adjusted in a manner that changes the particulate ingress influencing properties to affect the rebounding, coalescing and hydrophilic characteristics of the particulates at the point of impact with the surface(s) containing the coating. In particular, the tan δ ratio and modulus to hardness ratio can be optimized to enhance the right balance of rebound and erosion capability respectively. Furthermore, by increasing the presence of C—O and C=O bond, an increased hydrophilic property can be achieved.

Consider a scenario in which the air intake system and the gas turbine system operate in a dusty and sandy environment such as in desert and arid regions where there is a prevalence of more solid particles and relatively lower humidity/water droplets. In this scenario, it might be desirable to impart a specified bouncing or rebounding effect to the particulates in the stream of inlet air so that the particulates are entrained at the point of impact with the surface having the coating. In one embodiment, the chemical composition of the particulate intrusion protective coating for this scenario can include 10-90 wt. % Polyurethane+5-40 wt. % Epoxy. In one embodiment, the chemical composition of the particulate intrusion protective coating for this desert and arid region scenario can include 65 wt. % Polyurethane+10-15 wt. % Epoxy+5-10% wt. Silica+5 wt. % fiber (ether/esters), where the bolded values represent a minimum requirement of a typical composition.

In a scenario in which the air intake system and the gas turbine system operate in a coastal region environment, these systems will be exposed to a higher percentage of moisture and lesser solid particles. In one embodiment, the chemical composition of the particulate intrusion protective coating for this scenario can include 10-90 wt. % Epoxy+ 5-35 wt. % Polyurethane. In another embodiment, the chemical composition of the particulate intrusion protective coating for this coastal region environment scenario can include 10-90 wt. % Epoxy+10-30 wt. % Polyurethane+5-15 wt. % Modifiers, where the bolded values represent a minimum requirement of a typical composition.

In a scenario in which the air intake system and the gas turbine system operate in an environment characterized as both coastal and desert/arid regions, these systems will be exposed to both solid particles as well as water droplets. In one embodiment, the particulate intrusion protective coating for this scenario can include a multi-layer coating. For example, the multi-layered particulate intrusion protective coating for this scenario can include a top layer having 10-75 wt. % Polyurethane+5-40 wt. % Epoxy) composition, and a bottom layer deposited on a substrate having 10-75 wt. % Epoxy+5-40 wt. % PU. In one embodiment, this multi-layered particulate intrusion protective coating can include a top layer having 10-75 wt. % Polyurethane+10-20 wt. % Epoxy+5% Modifiers, and a bottom layer having 10-75 wt. % Epoxy+10-30 wt. % Polyurethane, where the bolded values represent a minimum requirement of a typical composition. These examples of multi-layered particulate intrusion protective coatings can also include a multiple of layers of varying gradient composition.

The chemical composition of the particulate intrusion protective coating of the various embodiments, including but not limited to the above examples, can be adjusted to change the rebounding effect that the coating will have on the particulates. In one embodiment, the particulate ingress influencing properties of the particulate intrusion protective coating can be adjusted to achieve a low bouncing effect or a high bouncing effect of the particulates at the point of impact with the surface of the component having the particulate intrusion protective coating. As used herein, "a low bouncing effect" means a coefficient of restitution defined as e=Rebound Velocity/Impact Velocity, is less than 1. and "a high bouncing effect" means a coefficient of restitution e that is greater than 1.

The desirability of having the particulate intrusion protective coating impart a low bouncing effect or a high bouncing effect may depend on factors including, but not limited to, the location and application of the coating in the air intake system, the location of operation of the air intake system and the particulate. In either case, the low bouncing effect and the high bouncing effect change the particulate trajectory after impact at the given location, allowing the particulate to bounce and flow out to a location of interest away from the core flow, to be filtered or ejected out eventually from the flow path. In one example, the chemical composition of the particulate intrusion protective coating of the various embodiments such as isocyanate and polyol of Polyurethane can be adjusted to impart a low rebounding effect by having a higher Tan δ obtained by decreasing the Polyol % and modifiers. In another example, the chemical composition of the particulate intrusion protective coating of the various embodiments such as isocyanate and polyol of Polyurethane can be adjusted to impart a high rebounding effect by having a lower Tan δ by increasing the Polyol % and modifiers.

With the ability to tailor the one or more particulate ingress influencing properties of the particulate intrusion protective coating in the aforementioned manner, the various embodiments can be used to customize the coating to the particular region of operation of the gas turbine system (e.g., desert, coastal, high or low elevation, rural, industrial, etc.)

and the particulates that are commonly associated with the region of operation. Accordingly, the various embodiments can be directed to a method for mitigating particulate intrusion into an air intake system of a gas turbine system. The method can comprise determining a locale of operation in which the air intake system and the gas turbine system is used or will be used. The common attributes of the particulates associated with the determined locale of operation that are expected to be ingested by the air intake system and the gas turbine system while operating in the determined locale of operation are then ascertained.

A particulate intrusion protective coating can be customized for application to a surface of a component of the air intake system to mitigate ingress of the particulates within the air intake system and the gas turbine system. For example, the particulate intrusion protective coating can be customized for application to one or more components of the inlet filter house 16 (e.g., inlet vane separators 56, moisture separators 60, drift eliminators 68). The customizing of the particulate intrusion protective coating can include altering a chemical composition of the particulate intrusion protective coating in the aforementioned manner to have one or more particulate ingress influencing properties tailored to the ascertained common attributes of the particulates associated with the determined locale of operation. In this manner, the particulate ingress influencing properties can affect rebounding and coalescing characteristics of the particulates at a point of impact with the component having the particulate intrusion protective coating. The customized coating can then be applied to the desired surface of one or more components of the inlet filter house and used to entrain the particulates at the point of impact, and inhibit further ingress along the inlet air flow path of the air intake system from the inlet filter house into the gas turbine. To this extent, the coating modifies the base metal surface of these components of the inlet filter house to mitigate ingress of particulates.

It is understood that other surface treatments of the components of the inlet filter house can be used in conjunction with the application of any of the particulate intrusion protective coatings described herein. These other surface treatments can include, but are not limited to, anodizing the surfaces of the components of the inlet filter house (e.g., anodizing of Aluminum to achieve hydrophobic behavior), and surface texturing to achieve hydrophobic or hydrophilic properties.

FIG. 8 shows an example of an application of particulate intrusion protective coating to a component of the inlet filer house that has been tailored to attain desired rebounding and coalescing characteristics of the particulates at a point of impact with the component. In particular, FIG. 8 shows an inertial separator 74 with a low rebound coating 76 and a high rebound coating 78 applied at certain sections of the inertial separator to attain a reduced differential pressure. As shown in the example of FIG. 8, the low rebound coating 76 can be applied to planar sections 80 of the inertial separator 74, while the high rebound coating 78 can be applied to trap sections 82 ("droplet catchers") of the inertial separator. In this manner, the low rebound coating 76 applied to the planar sections 80 of the inertial separator 74 can direct more particles or droplets of a certain size (e.g., 20 microns) from the stream of inlet air 20 to the trap sections 82, while the high rebound coating 78 inside the trap sections can capture more of the droplets. In one embodiment, in which the particulates include solid particles and water droplets, a low rebound coating can be applied at various sections of the inertial separator 74 (e.g., at the location of coating 76) to have a low rebound effect on the solid particles, while being hydrophobic to water droplets. In addition, a low rebound coating can be applied at other sections of the inertial separator 74 (e.g., at the location of coating 78) to have a low rebound effect on the solid particles, while being hydrophilic to water droplets. With this embodiment, it is possible to optimize the existing designs/shapes of the filtration equipment to help make the air intake system more efficient for the gas turbine engine by having lower differential pressure at the inlet filter house.

Trap sections of inertial separators are known to cause differential pressure, however, this differential pressure can be reduced due to the improved direction of the droplets that is attained with this embodiment. In particular, this improved direction of the droplets results in enhanced removal efficiency. This enhanced removal efficiency can lead to a reduction in differential pressure. Those skilled in the art will appreciate that a balance between differential pressure and removal efficiency is necessary in putting this configuration into use in an air intake system of a gas turbine system. It is understood that the example depicted in FIG. 8 is representative of one approach to reducing differential pressure in an inertial separator and is not meant to be limiting. Furthermore, it is understood that the low rebound coating 76 and the high rebound coating 78 can be applied to other planar sections 80 and trap sections 82 in the inertial separator 74 than those that are depicted in FIG. 8.

EXAMPLES

The following provides particular examples demonstrating one or more particulate ingress influencing properties resulting from the use of a particulate intrusion protective coating according to the various embodiments described herein for mitigating ingress of particulates within an air intake system of a gas turbine system.

Comparative Example 1

In this example, a titanium substrate (Ti-6-4) with a particulate intrusion protective coating of polyurethane INTERZONE 954 was compared to a titanium substrate (Ti-6-4). In this example, the Ti-6-4 substrate and the Ti-6-4 substrate with the polyurethane INTERZONE 954 coating were tested in the following manner. Silica particles having a particle size of $d_{50}$-50 um were entrained in an air flow jet, which was fixed at an air pressure of 2 bar. This resulted in a particle velocity of 50 m/s. The particles were made to impinge the Ti-6-4 uncoated baseline as well as Polyurethane coated substrate at an impact angle of 15 deg. Post impingement, the particle trajectory was measured using a high speed camera photography and the rebound angle as well as the number of particles were measured at each rebound angle using image analysis. Compared to the uncoated Ti-6-4 baseline, a 34% decrease in coefficient of restitution was observed on the coated samples.

From the description of the illustrated embodiments and the examples, it is evident that the subject disclosure sets forth an effective solution to mitigating the intrusion of particulates and/or foreign object debris into an air intake system of a gas turbine system. In particular, the various embodiments present an approach that utilizes a particulate intrusion protective coating that can be customized to one or more particulate ingress influencing properties tailored to the common attributes of the particulates associated with the locale of operation of the air intake system and the gas turbine system. The particulate ingress influencing properties can affect rebounding and coalescing characteristics of the particulates at a point of impact with the component having the particulate intrusion protective coating, such that the particulates are entrained at the point of impact and inhibited from further ingress along the inlet air flow path of the air intake system into the gas turbine.

Accordingly, the various embodiments are amenable for industrial application in that these embodiments relate to the technical field of gas turbine systems, and present a solution to a technical problem that particulates in a stream of inlet air can have on the operation and performance of various components including, but not limited to, the air intake system and the gas turbine engine. The particulate intrusion protective coating of the various embodiments and the ability to customize the coating to a specific locale of operation will minimize the risk of sand, dust, dirt, salt, foreign object debris, and the like, on the performance, degradation, maintenance factor and the risk of fouling, erosion, or corrosion of part failures in a gas turbine system. Hence, the various embodiments can assist in improving the reliability, maintainability and performance of gas turbine engines, as well as minimize forced outages and catastrophic events due to inlet filtration issues and foreign object debris ingress in the stream of inlet air.

With such features, the various embodiments have applicable value for power plants operating in arid regions and/or close to a desert/dusty/industrial zones. In such areas, a higher availability, reliability and power output can be expected. Furthermore, the cost of forced outages and hot gas parts damage are of importance and commercial value to power plant operators. As a result, the various embodiments are appealing to power plant operators.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize. For example, parts, components, steps and aspects from different embodiments may be combined or suitable for use in other embodiments even though not described in the disclosure or depicted in the figures. Therefore, since certain changes may be made in the above-described invention, without departing from the spirit and scope of the invention herein involved, it is intended that all of the subject matter of the above description shown in the accompanying drawings shall be interpreted merely as examples illustrating the inventive concept herein and shall not be construed as limiting the invention.

In this regard, while the disclosed subject matter has been described in connection with various embodiments and corresponding figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below. For example, references to "one embodiment" of the present invention are not intended to be interpreted as excluding the existence of additional embodiments that also incorporate the recited features.

In the appended claims, the terms "including" and "in which" are used as the plain-English equivalents of the respective terms "comprising" and "wherein." Moreover, in the following claims, terms such as "first," "second," "third," "upper," "lower," "bottom," "top," etc. are used merely as labels, and are not intended to impose numerical or positional requirements on their objects. The terms "substantially," "generally," and "about" indicate conditions within reasonably achievable manufacturing and assembly tolerances, relative to ideal desired conditions suitable for achieving the functional purpose of a component or assembly. Further, the limitations of the following claims are not written in means-plus-function format and are not intended to be interpreted as such, unless and until such claim limitations expressly use the phrase "means for" followed by a statement of function void of further structure.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

What has been described above includes examples of systems and methods illustrative of the disclosed subject matter. It is, of course, not possible to describe every combination of components or methodologies here. One of ordinary skill in the art may recognize that many further combinations and permutations of the claimed subject matter are possible. Furthermore, to the extent that the terms "includes," "has," "possesses," and the like are used in the detailed description, claims, appendices and drawings, such terms are intended to be inclusive in a manner similar to the term "comprising" as "comprising" is interpreted when employed as a transitional word in a claim. That is, unless explicitly stated to the contrary, embodiments "comprising," "including," or "having" an element or a plurality of elements having a particular property may include additional such elements not having that property.

This written description uses examples to disclose several embodiments of the invention, including the best mode, and also to enable one of ordinary skill in the art to practice the embodiments of invention, including making and using any devices or systems and performing any incorporated methods. The patentable scope of the invention is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

Further aspects of the invention are provided by the subject matter of the following clauses:

A method for mitigating particulate intrusion into an air intake system of a gas turbine system having a gas turbine engine, comprising: determining a locale of operation of the air intake system and the gas turbine system; ascertaining common attributes of particulates associated with the determined locale of operation that are expected to be ingested by the air intake system and the gas turbine system while operating in the determined locale of operation; and applying a particulate intrusion protective coating to a surface of a component of the air intake system to mitigate ingress of the particulates within the air intake system and the gas turbine system, wherein the particulate intrusion protective coating includes one or more particulate ingress influencing properties tailored to the ascertained common attributes of the particulates associated with the determined locale of operation, wherein the particulate ingress influencing properties affect rebounding, coalescing and hydrophilic characteristics of the particulates at a point of impact with the surface of the component having the particulate intrusion protective coating, entraining the particulates at the point of impact and inhibiting further ingress along the inlet air flow path of the air intake system into the gas turbine engine.

The method of the preceding clause, wherein the applying of the particulate intrusion protective coating to the component of the air intake system comprises applying the particulate intrusion protective coating to surfaces of one or more components of an inlet filter house.

The method of any of the preceding clauses, wherein the applying of the particulate intrusion protective coating to the surfaces of the one or more components of the inlet filter house comprises applying the particulate intrusion protective coating to the surfaces of one or more of an inlet vane separator, a moisture separator, and a drift eliminator.

The method of any of the preceding clauses, further comprising adjusting the particulate ingress influencing properties of the particulate intrusion protective coating to achieve one or more of a low rebounding effect and a high rebounding effect of the particulates at the point of impact with the component having the particulate intrusion protective coating.

The method of any of the preceding clauses, wherein the adjusting of the particulate ingress influencing properties of the particulate intrusion protective coating to achieve the low rebounding effect and the high rebounding effect comprises altering the chemical composition of the particulate intrusion protective coating.

The method of any of the preceding clauses, wherein the particulate intrusion protective coating is a resin comprising one or more of polyurethane coatings, epoxy coatings, and combinations thereof.

The method of any of the preceding clauses, wherein the resin further includes a modifier to enhance properties of the particulate intrusion protective coating, the properties including one or more of strength, erosion performance and damping behavior, and wherein the modifier includes one or more of a particle modifier and a functional modifier.

The method of any of the preceding clauses, wherein the particulate intrusion protective coating comprises a multi-layer coating.

The method of any of the preceding clauses, wherein the multi-layer coating comprises one or more polyurethane layer and one or more epoxy layer, wherein the one or more polyurethane layer and the one or more epoxy layer are tailored to attain a desired rebounding and coalescing effect on the particulates at the point of impact with the component.

A method, comprising: determining a locale of operation of an air intake system of a gas turbine system having a gas turbine engine; ascertaining common attributes of particulates associated with the determined locale of operation that are expected to be ingested by the air intake system and the gas turbine system while operating in the determined locale of operation; customizing a particulate intrusion protective coating for application to a surface of a component of an inlet filter house of the air intake system with properties that mitigate ingress of the particulates within the air intake system and the gas turbine system for operation in the determined locale, wherein the customizing of the particulate intrusion protective coating includes altering a chemical composition of the particulate intrusion protective coating to have one or more particulate ingress influencing properties tailored to the ascertained common attributes of the particulates associated with the determined locale of operation, wherein the particulate ingress influencing properties affect rebounding, coalescing and hydrophilic characteristics of the particulates at a point of impact with the surface of the component of the inlet filter house having the particulate intrusion protective coating; and applying the customized particulate intrusion protective coating to the surface of one or more components of the inlet filter house, wherein the customized particulate intrusion protective coating applied to the surface of the one or more components of the inlet filter house entrains the particulates at the point of impact, and inhibits further ingress along the inlet air flow path of the air intake system from the inlet filter house into the gas turbine engine.

The method of the preceding clause, wherein the applying of the particulate intrusion protective coating to the surfaces of the one or more components of the inlet filter house comprises applying the particulate intrusion protective coating to the surfaces of one or more of an inlet vane separator, a moisture separator, and a drift eliminator.

The method of any of the preceding clauses, wherein the customizing of the particulate intrusion protective coating comprising adjusting the particulate ingress influencing properties of the particulate intrusion protective coating to achieve one or more of a low rebounding effect and a high rebounding effect of the particulates at the point of impact with the component having the particulate intrusion protective coating.

The method of any of the preceding clauses, wherein the adjusting of the particulate ingress influencing properties of the particulate intrusion protective coating to achieve the low rebounding effect and the high rebounding effect comprises altering the chemical composition of the particulate intrusion protective coating.

The method of any of the preceding clauses, further comprising applying a particulate intrusion protective coating having a low rebounding effect and a particulate intrusion protective coating having a high rebounding effect to the component of the inlet filter house to attain a reduced differential pressure.

The method of any of the preceding clauses, wherein the altering of the chemical composition includes balancing the rebounding, the coalescence and the hydrophilic nature of the particulate intrusion protective coating to attain desired particulate ingress influencing properties.

A gas turbine system, comprising: a gas turbine engine; an air intake system operatively coupled to the gas turbine engine to direct a stream of inlet air to the gas turbine engine, the air intake system comprising an inlet filter house having a weather hood with a plurality of inlet vane separators and a plurality of moisture separators to permit passage of the stream of inlet air while preventing passage of weather elements, a filter module to filter the stream of inlet air passing through the weather hood, a cooling module to adjust the temperature of the filtered stream of inlet air, and a plurality of drift eliminators to protect against water carry-over from the cooling module; and a particulate intrusion protective coating applied to a surface of one or more of the plurality of inlet vane separators, the plurality of moisture separators, and the plurality of drift eliminators, wherein the particulate intrusion protective coating includes one or more particulate ingress influencing properties tailored to common attributes of particulates associated with a locale of operation of the gas turbine engine and the air intake system, wherein the particulate ingress influencing properties affect rebounding coalescing, and hydrophilic characteristics of the particulates at a point of impact with the applied surface having the particulate intrusion protective coating, entraining the particulates at the point of impact and inhibiting further ingress along an inlet air flow path of the air intake system into the gas turbine engine.

The system of the preceding clause, wherein the particulate intrusion protective coating comprises a chemical composition configured to provide one or more of a low rebounding effect and a high rebounding effect on the particulates at the point of impact with the applied surface having the particulate intrusion protective coating.

The system of any of the preceding clauses, wherein the particulate intrusion protective coating changes a trajectory of the particulates at the point of impact with the applied surface having the particulate intrusion protective coating, prompting the particulates to rebound and flow out to a location out from the inlet air flow path.

The system of any of the preceding clauses, wherein the particulate intrusion protective coating is configured to protect the applied surface having the particulate intrusion protective coating against erosion, corrosion and fouling.

The system of any of the preceding clauses, wherein the particulate intrusion protective coating is a resin comprising one or more of polyurethane coatings, epoxy coatings, and combinations thereof.

What is claimed is:

1. A method for mitigating particulate intrusion into an air intake system of a gas turbine system having a gas turbine engine, comprising:
    determining a locale of operation of the air intake system and the gas turbine system;
    ascertaining common attributes of particulates associated with the determined locale of operation that are expected to be ingested by the air intake system and the gas turbine system while operating in the determined locale of operation; and
    applying a particulate intrusion protective coating to a surface of a component of the air intake system to mitigate ingress of the particulates within the air intake system and the gas turbine system, wherein the particulate intrusion protective coating includes one or more particulate ingress influencing properties tailored to the ascertained common attributes of the particulates associated with the determined locale of operation, wherein the particulate ingress influencing properties affect rebounding, coalescing and hydrophilic characteristics of the particulates at a point of impact with the surface of the component having the particulate intrusion protective coating, entraining the particulates at the point of impact and inhibiting further ingress along the inlet air flow path of the air intake system into the gas turbine engine, wherein the particulate intrusion protective coating is a multi-layer coating comprising one or more polyurethane layer and one or more epoxy layer, wherein the one or more polyurethane layer and the one or more epoxy layer are tailored to attain a desired rebounding and coalescing effect on the particulates at the point of impact with the component, and wherein the multi-layered particulate intrusion protective coating comprises a top layer having 10-75 wt. % Polyurethane +5-40 wt. % Epoxy composition, and a bottom layer deposited on a substrate having 10-75 wt. % Epoxy+5-40 wt. % Polyurethane.

2. The method according to claim 1, wherein the applying of the particulate intrusion protective coating to the component of the air intake system comprises applying the particulate intrusion protective coating to surfaces of one or more components of an inlet filter house.

3. The method according to claim 2, wherein the applying of the particulate intrusion protective coating to the surfaces of the one or more components of the inlet filter house comprises applying the particulate intrusion protective coating to the surfaces of one or more of an inlet vane separator, a moisture separator, and a drift eliminator.

4. The method according to claim 1, further comprising adjusting the particulate ingress influencing properties of the particulate intrusion protective coating to achieve one or more of a low rebounding effect and a high rebounding effect of the particulates at the point of impact with the component having the particulate intrusion protective coating.

5. The method according to claim 4, wherein the adjusting of the particulate ingress influencing properties of the particulate intrusion protective coating to achieve the low rebounding effect and the high rebounding effect comprises altering the chemical composition of the particulate intrusion protective coating.

6. The method according to claim 1, wherein the particulate intrusion protective coating is a resin comprising one or more of polyurethane coatings, epoxy coatings, and combinations thereof.

7. The method according to claim 6, wherein the resin further includes a modifier to enhance properties of the particulate intrusion protective coating, the properties including one or more of strength, erosion performance and damping behavior, and wherein the modifier includes one or more of a particle modifier and a functional modifier.

8. The method according to claim 1, wherein the Epoxy of the top layer of the multi-layered particulate intrusion protective coating comprises +10-20 wt. %, wherein top layer of the multi-layered particulate intrusion protective coating further comprises +5% Modifiers, and wherein the Polyurethane in the bottom layer comprises +10-30 wt. % Polyurethane, where the bolded values represent a minimum requirement of a typical composition.

9. A method, comprising:
    determining a locale of operation of an air intake system of a gas turbine system having a gas turbine engine;
    ascertaining common attributes of particulates associated with the determined locale of operation that are expected to be ingested by the air intake system and the gas turbine system while operating in the determined locale of operation;
    customizing a particulate intrusion protective coating for application to a surface of a component of an inlet filter house of the air intake system with properties that mitigate ingress of the particulates within the air intake system and the gas turbine system for operation in the determined locale, wherein the customizing of the particulate intrusion protective coating includes altering a chemical composition of the particulate intrusion protective coating to have one or more particulate ingress influencing properties tailored to the ascertained common attributes of the particulates associated with the determined locale of operation, wherein the particulate ingress influencing properties affect rebounding, coalescing, and hydrophilic characteristics of the particulates at a point of impact with the surface of the component of the inlet filter house having the particulate intrusion protective coating, wherein the customizing of the particulate intrusion protective coating comprising adjusting the particulate ingress influencing properties of the particulate intrusion protective coating to achieve one or more of a low rebounding effect and a high rebounding effect of the particulates at the point of impact with the component having the particulate intrusion protective coating, wherein the customized particulate intrusion protective coating is a multi-layered particulate intrusion protective coating comprising a top layer having 10-75 wt. % Polyurethane+5-40 wt. % Epoxy composition, and a bottom layer deposited on a substrate having 10-75 wt. % Epoxy+5-40 wt. % PU; and applying the customized particulate intrusion protective coating to the surface of one or more components of the inlet filter house, wherein the customized particulate intrusion protective coating applied to the surface of the one or more components of the inlet filter house entrains the particulates at the point of impact, and inhibits further ingress along the inlet air flow path of the air intake system from the inlet filter house into the gas turbine engine.

10. The method according to claim 9, wherein the applying of the particulate intrusion protective coating to the surfaces of the one or more components of the inlet filter house comprises applying the particulate intrusion protective coating to the surfaces of one or more of an inlet vane separator, a moisture separator, and a drift eliminator.

11. The method according to claim 9, wherein the customizing of the particulate intrusion protective coating comprising adjusting the particulate ingress influencing properties of the particulate intrusion protective coating to achieve one or more of a low rebounding effect and a high rebounding effect of the particulates at the point of impact with the component having the particulate intrusion protective coating.

12. The method according to claim 11, wherein the adjusting of the particulate ingress influencing properties of the particulate intrusion protective coating to achieve the low rebounding effect and the high rebounding effect comprises altering the chemical composition of the particulate intrusion protective coating.

13. The method according to 11, further comprising applying a particulate intrusion protective coating having a low rebounding effect and a particulate intrusion protective coating having a high rebounding effect to the component of the inlet filter house to attain a reduced differential pressure.

14. The method according to claim 9, wherein the altering of the chemical composition includes balancing the rebounding, the coalescence and the hydrophilic nature of the particulate intrusion protective coating to attain desired particulate ingress influencing properties.

15. A gas turbine system, comprising:
a gas turbine engine;
an air intake system operatively coupled to the gas turbine engine to direct a stream of inlet air to the gas turbine engine, the air intake system comprising an inlet filter house having a weather hood with a plurality of inlet vane separators and a plurality of moisture separators to permit passage of the stream of inlet air while preventing passage of weather elements, a filter module to filter the stream of inlet air passing through the weather hood, a cooling module to adjust the temperature of the filtered stream of inlet air, and a plurality of drift eliminators to protect against water carry-over from the cooling module; and a particulate intrusion protective coating applied to a surface of one or more of the plurality of inlet vane separators, the plurality of moisture separators, and the plurality of drift eliminators, wherein the particulate intrusion protective coating includes one or more particulate ingress influencing properties tailored to common attributes of particulates associated with a locale of operation of the gas turbine engine and the air intake system, wherein the particulate ingress influencing properties affect rebounding, coalescing, and hydrophilic characteristics of the particulates at a point of impact with the applied surface having the particulate intrusion protective coating, entraining the particulates at the point of impact and inhibiting further ingress along an inlet air flow path of the air intake system into the gas turbine engine, wherein the particulate intrusion protective coating is a multi-layer coating comprising one or more polyurethane layer and one or more epoxy layer, wherein the one or more polyurethane layer and the one or more epoxy layer are tailored to attain a desired rebounding and coalescing effect on the particulates at the point of impact with the component, and wherein the multi-layered particulate intrusion protective coating comprises a top layer having 10-75 wt. % Polyurethane+5-40 wt. % Epoxy composition, and a bottom layer deposited on a substrate having 10-75 wt. % Epoxy+5-40 wt. % Polyurethane.

16. The gas turbine system of claim 15, wherein the particulate intrusion protective coating comprises a chemical composition configured to provide one or more of a low rebounding effect and a high rebounding effect on the particulates at the point of impact with the applied surface having the particulate intrusion protective coating.

17. The gas turbine system of claim 15, wherein the particulate intrusion protective coating changes a trajectory of the particulates at the point of impact with the applied surface having the particulate intrusion protective coating, prompting the particulates to rebound and flow out to a location out from the inlet air flow path.

18. The gas turbine system of claim 15, wherein the particulate intrusion protective coating is configured to protect the applied surface having the particulate intrusion protective coating against erosion, corrosion and fouling.

19. The gas turbine system of claim 15, wherein the particulate intrusion protective coating is a resin comprising one or more of polyurethane coatings, epoxy coatings, and combinations thereof.

* * * * *